May 13, 1924.
J. J. MEYERS
TOOL FOR MOUNTING DISK WHEELS
Filed Aug. 29, 1923
1,494,269
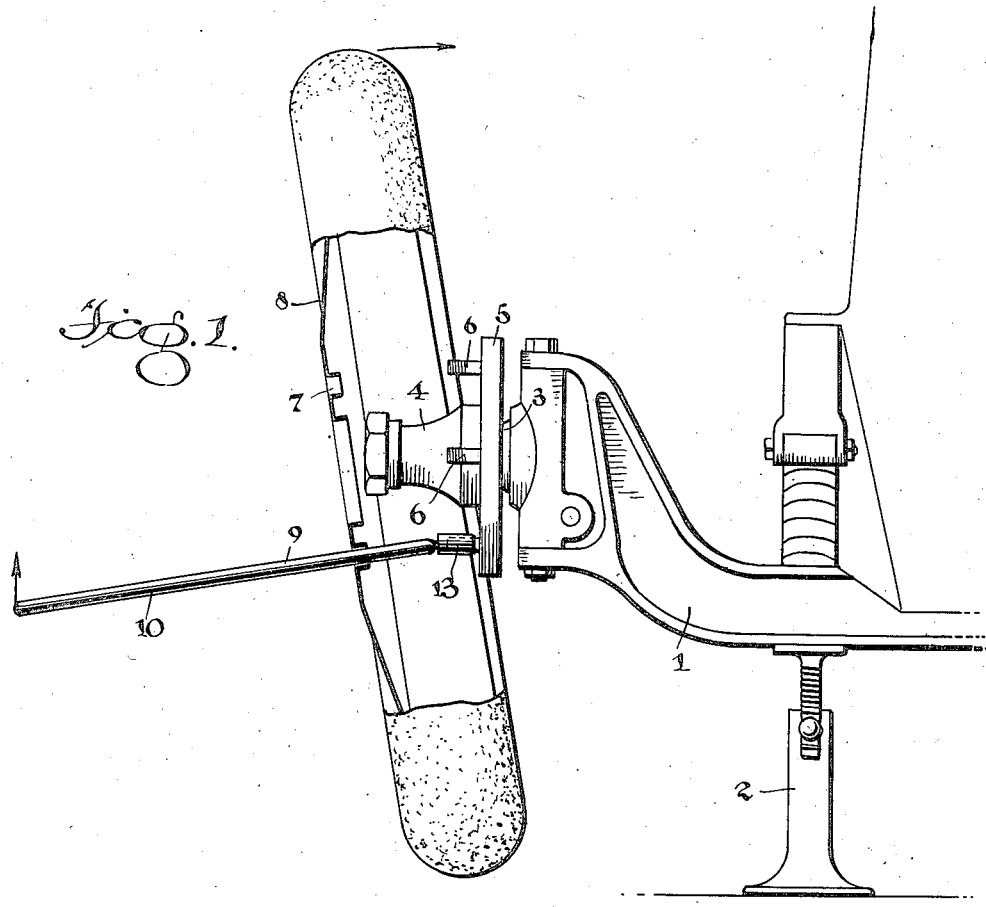
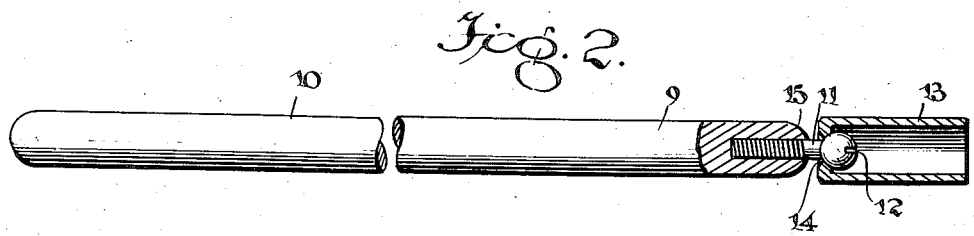
INVENTOR.
John J. Meyers,
BY
Geo. P. Kimmel ATTORNEY.

Patented May 13, 1924.

1,494,269

UNITED STATES PATENT OFFICE.

JOHN J. MEYERS, OF PITTSBURGH, PENNSYLVANIA.

TOOL FOR MOUNTING DISK WHEELS.

Application filed August 29, 1923. Serial No. 659,962.

*To all whom it may concern:*

Be it known that I, JOHN J. MEYERS, a citizen of the United States, residing at Pittsburgh, in the county of Allegheny and State of Pennsylvania, have invented certain new and useful Improvements in Tools for Mounting Disk Wheels, of which the following is a specification.

This invention relates to tools for use of automobilists and auto mechanics and has for its object the provision, in a manner as hereinafter set forth, of a tool the use of which will greatly reduce the work incident to the application of a disk wheel to an automobile axle.

It is well known that when changing a wheel of an automobile, where the disk type of wheel is used, it is necessary for the operator to lift the wheel to the hub and move the wheel around until the bolts surrounding the hub align with the passages provided for them in the body of the wheel, before the wheel can be mounted on the hub. This means that the operator must support the full weight of the wheel until the passages align with the bolts around the hub, to allow it being shoved onto the hub. This method causes a strain upon the operator, whereas with the tool provided herewith the operator is relieved of all strain, the tool carrying the weight of the wheel.

It is a further object of this invention to provide, in a manner as hereinafter set forth, a tool strong and capable of carrying the weight of the heaviest wheels, yet of a size which will allow it being stored in a small space, and of simple structure making it inexpensive to manufacture.

The invention will be best understood from a consideration of the following detailed description taken in connection with the accompanying drawing forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 1 is a view of the device embodying the invention, showing it as in use.

Figure 2 is an elevation of the tool, a portion being shown in section.

Referring now to the drawings, wherein like numerals of reference indicate corresponding parts in both of the views, one end of the front axle of an automobile is shown at 1, supported by a jack 2. The spindle 3, carries a hub 4, provided with the abutment disk 5. This disk has projecting from its face a series of threaded lugs 6, which are made to pass through the corresponding apertures 7 in the disk wheel 8. Nuts are then applied to the ends of the lugs and drawn tight against the outer surface of the wheel to clamp it tightly against the disk 5 securing it upon the hub.

In order to make the operation of applying the wheel shorter and easier, the tool 9, is used according to the showing of the drawing. This tool consists of a handle 10 having secured in its end the round headed screw 11 provided with the slot 12. A socket member 13 is loosely secured to the end of the handle 10 by means of the screw 11, the shank of which passes through an aperture 14, in the rear end of the socket, the head preventing further passage and thus forming a loose connection. The end of the handle is rounded as at 15, to allow a free movement of the socket.

The operation of the tool is as follows: When it is desired to apply a wheel the socket end of the tool is passed through the aperture 7, and the socket 13, made to engage the end of the lower one of the lugs 6, as shown in Fig. 1. The handle of the tool is then raised with one hand, thus raising the wheel, until the handle is a little above the horizontal position, whereupon with the other hand the wheel is shoved inward sliding it down the handle until the lugs engage and pass through the apertures 7. It is then only necessary to apply the nuts to the lugs and the wheel is ready for use.

Having thus described the invention, what is claimed as new is:—

1. A tool for the purpose set forth comprising, a substantially elongated handle member, a bolt engaging member at one end of said handle, and means for setting up a loose connection between said handle and bolt engaging member.

2. A tool for the purpose set forth comprising a substantially elongated handle member, a socket member positioned at one end of said handle member, and a screw having a globular head positioned within said socket member and having its shank extended through the inner end of said socket and secured in the end of the handle, for setting up a loose connection between the two members.

In testimony whereof, I affix my signature hereto.

JOHN J. MEYERS.